United States Patent
Sirpal

(10) Patent No.: US 9,046,992 B2
(45) Date of Patent: Jun. 2, 2015

(54) GESTURE CONTROLS FOR MULTI-SCREEN USER INTERFACE

(75) Inventor: Sanjiv Sirpal, Oakville (CA)

(73) Assignee: Z124, George Town (KY)

( * ) Notice: Subject to any disclaimer, the term of this patent is extended or adjusted under 35 U.S.C. 154(b) by 156 days.

(21) Appl. No.: 12/948,667

(22) Filed: Nov. 17, 2010

(65) Prior Publication Data

US 2012/0084735 A1    Apr. 5, 2012

Related U.S. Application Data

(60) Provisional application No. 61/389,000, filed on Oct. 1, 2010, provisional application No. 61/389,117, filed on Oct. 1, 2010, provisional application No. 61/389,087, filed on Oct. 1, 2010.

(51) Int. Cl.
| | |
|---|---|
| *G06F 3/033* | (2013.01) |
| *G06F 3/0483* | (2013.01) |
| *G06F 1/16* | (2006.01) |
| *G06F 3/0481* | (2013.01) |
| *G06F 3/0488* | (2013.01) |

(Continued)

(52) U.S. Cl.
CPC ............ *G06F 3/0483* (2013.01); *G06F 1/1616* (2013.01); *G06F 1/1641* (2013.01); *G06F 3/0481* (2013.01); *G06F 3/04883* (2013.01); *G06F 1/1647* (2013.01); *G06F 3/04847* (2013.01); *G06F 3/0488* (2013.01); *G06F 3/04842* (2013.01); *G06F 3/0486* (2013.01)

(58) Field of Classification Search
CPC . G06F 3/0488; G06F 3/04886; G06F 1/1643; G06F 3/0416; G06F 2203/04808; G06F 2203/04803; G06F 3/14; G06F 1/1616; G06F 1/1637; H04M 2250/22
USPC .......................................... 715/863; 345/157
See application file for complete search history.

(56) References Cited

U.S. PATENT DOCUMENTS

| | | |
|---|---|---|
| 5,252,951 A | 10/1993 | Tannenbaum et al. |
| 6,243,645 B1 | 6/2001 | Moteki et al. |
| 6,331,840 B1 | 12/2001 | Nielson |

(Continued)

FOREIGN PATENT DOCUMENTS

| | | |
|---|---|---|
| EP | 2166437 | 3/2010 |
| EP | 2309369 | 4/2011 |

(Continued)

OTHER PUBLICATIONS http://www.dailymail.co.uk/sciencetech/article-2525812/Double-vision-Samsung-unveils-phone-two-screens-easier-reading-gaming-video-conferencing.html.*

(Continued)

*Primary Examiner* — Amy Ng
*Assistant Examiner* — Andres E Gutierrez
(74) *Attorney, Agent, or Firm* — Sheridan Ross P.C.

(57) ABSTRACT

Method and apparatus for controlling a computing device using gesture inputs. The computing device may be a handheld computing device with multiple displays. The displays may be capable of displaying a graphical user interface (GUI). The GUI may be a multi screen GUI or a single screen GUI such that receipt of gesture inputs may result in the movement of a GUI from one display to another display or may result in maximization of a multi screen GUI across multiple displays.

13 Claims, 12 Drawing Sheets

(51) Int. Cl.
  *G06F 3/0484*  (2013.01)
  *G06F 3/0486*  (2013.01)

(56) References Cited

U.S. PATENT DOCUMENTS

| | | | |
|---|---|---|---|
| 6,385,331 B2 | 5/2002 | Harakawa et al. | |
| 6,545,669 B1 | 4/2003 | Kinawi et al. | |
| 6,573,883 B1 | 6/2003 | Bartlett | |
| 6,861,946 B2 | 3/2005 | Verplaetse et al. | |
| 6,977,643 B2 | 12/2005 | Wilbrink et al. | |
| 7,840,912 B2 | 11/2010 | Elias et al. | |
| 7,844,301 B2 | 11/2010 | Lee et al. | |
| 7,870,496 B1 | 1/2011 | Sherwani | |
| 7,917,584 B2 | 3/2011 | Arthursson | |
| 7,936,341 B2 | 5/2011 | Weiss | |
| 8,171,427 B2 | 5/2012 | Chung et al. | |
| 8,194,043 B2 | 6/2012 | Cheon et al. | |
| 8,291,344 B2 | 10/2012 | Chaudhri | |
| 8,527,892 B2 | 9/2013 | Sirpal et al. | |
| 8,650,508 B2 | 2/2014 | Lim | |
| 8,704,781 B2 | 4/2014 | Kii | |
| 8,786,559 B2 | 7/2014 | Hogan | |
| 2002/0075289 A1 | 6/2002 | Hatori et al. | |
| 2003/0189597 A1 | 10/2003 | Anderson et al. | |
| 2004/0172279 A1 | 9/2004 | Carolan et al. | |
| 2005/0012723 A1 | 1/2005 | Pallakoff | |
| 2005/0030255 A1 | 2/2005 | Chiu et al. | |
| 2006/0161868 A1 | 7/2006 | Van Dok et al. | |
| 2006/0206825 A1 | 9/2006 | Dorn et al. | |
| 2006/0227106 A1* | 10/2006 | Hashimoto et al. | 345/157 |
| 2007/0046643 A1 | 3/2007 | Hillis et al. | |
| 2007/0064004 A1 | 3/2007 | Bonner et al. | |
| 2007/0192749 A1 | 8/2007 | Baudisch | |
| 2008/0062625 A1 | 3/2008 | Batio | |
| 2008/0152263 A1 | 6/2008 | Harrison | |
| 2008/0168290 A1 | 7/2008 | Jobs et al. | |
| 2008/0307351 A1 | 12/2008 | Louch et al. | |
| 2009/0027354 A1 | 1/2009 | Perski et al. | |
| 2009/0073194 A1 | 3/2009 | Ording | |
| 2009/0102744 A1* | 4/2009 | Ram | 345/1.1 |
| 2009/0204925 A1 | 8/2009 | Bhat et al. | |
| 2009/0209350 A1 | 8/2009 | Kelly et al. | |
| 2009/0213081 A1 | 8/2009 | Case, Jr. | |
| 2009/0259967 A1 | 10/2009 | Davidson et al. | |
| 2009/0278806 A1 | 11/2009 | Duarte et al. | |
| 2009/0289874 A1 | 11/2009 | Ha | |
| 2009/0298537 A1 | 12/2009 | Choi | |
| 2009/0303187 A1 | 12/2009 | Paliakoff | |
| 2009/0303231 A1 | 12/2009 | Robinet et al. | |
| 2010/0020025 A1 | 1/2010 | Lemort et al. | |
| 2010/0031186 A1 | 2/2010 | Tseng et al. | |
| 2010/0031202 A1 | 2/2010 | Morris et al. | |
| 2010/0064244 A1* | 3/2010 | Kilpatrick et al. | 715/773 |
| 2010/0064536 A1 | 3/2010 | Caskey et al. | |
| 2010/0081475 A1 | 4/2010 | Chiang et al. | |
| 2010/0083154 A1 | 4/2010 | Takeshita | |
| 2010/0115473 A1 | 5/2010 | Reeves et al. | |
| 2010/0146464 A1 | 6/2010 | Wilson et al. | |
| 2010/0156836 A1 | 6/2010 | Katayama | |
| 2010/0162128 A1 | 6/2010 | Richardson et al. | |
| 2010/0175018 A1 | 7/2010 | Petschnigg et al. | |
| 2010/0180297 A1 | 7/2010 | Levine et al. | |
| 2010/0182247 A1 | 7/2010 | Petschnigg et al. | |
| 2010/0188352 A1 | 7/2010 | Ikeda | |
| 2010/0211872 A1 | 8/2010 | Rolston et al. | |
| 2010/0211920 A1 | 8/2010 | Westerman et al. | |
| 2010/0214237 A1 | 8/2010 | Echeverri et al. | |
| 2010/0227650 A1 | 9/2010 | Kim et al. | |
| 2010/0231536 A1 | 9/2010 | Chaudhri et al. | |
| 2010/0245209 A1 | 9/2010 | Miller et al. | |
| 2010/0245256 A1 | 9/2010 | Estrada et al. | |
| 2010/0287513 A1 | 11/2010 | Singh et al. | |
| 2010/0295781 A1 | 11/2010 | Alameh et al. | |
| 2010/0298032 A1 | 11/2010 | Lee et al. | |
| 2010/0321319 A1 | 12/2010 | Hefti | |
| 2011/0025601 A1 | 2/2011 | Wilson et al. | |
| 2011/0039603 A1 | 2/2011 | Kim et al. | |
| 2011/0047459 A1 | 2/2011 | Van Der Westhuizen | |
| 2011/0066984 A1 | 3/2011 | Li | |
| 2011/0069021 A1 | 3/2011 | Hill | |
| 2011/0074696 A1 | 3/2011 | Rapp et al. | |
| 2011/0078624 A1 | 3/2011 | Missig et al. | |
| 2011/0081889 A1 | 4/2011 | Gao et al. | |
| 2011/0090255 A1 | 4/2011 | Wilson et al. | |
| 2011/0107272 A1* | 5/2011 | Aguilar | 715/853 |
| 2011/0145768 A1 | 6/2011 | Leffert et al. | |
| 2011/0209058 A1 | 8/2011 | Hinckley et al. | |
| 2011/0209099 A1 | 8/2011 | Hinckley et al. | |
| 2011/0209102 A1 | 8/2011 | Hinckley et al. | |
| 2011/0209104 A1 | 8/2011 | Hinckley et al. | |
| 2011/0221678 A1 | 9/2011 | Davydov | |
| 2011/0228463 A1* | 9/2011 | Matagne | 361/679.04 |
| 2011/0242138 A1 | 10/2011 | Tribble | |
| 2011/0260997 A1 | 10/2011 | Ozaki | |
| 2011/0265021 A1 | 10/2011 | Chien et al. | |
| 2011/0285631 A1 | 11/2011 | Imamura et al. | |
| 2012/0050779 A1 | 3/2012 | Tani et al. | |
| 2012/0056817 A1 | 3/2012 | Griffin et al. | |
| 2012/0081293 A1 | 4/2012 | Sirpal et al. | |
| 2012/0081306 A1 | 4/2012 | Sirpal et al. | |
| 2012/0081307 A1 | 4/2012 | Sirpal et al. | |
| 2012/0081308 A1 | 4/2012 | Sirpal | |
| 2012/0081310 A1 | 4/2012 | Schrock | |
| 2012/0081316 A1 | 4/2012 | Sirpal et al. | |
| 2012/0084673 A1 | 4/2012 | Sirpal et al. | |
| 2012/0084678 A1 | 4/2012 | Sirpal et al. | |
| 2012/0084679 A1 | 4/2012 | Sirpal et al. | |
| 2012/0084680 A1 | 4/2012 | Gimpl et al. | |
| 2012/0084690 A1 | 4/2012 | Sirpal et al. | |
| 2012/0084700 A1 | 4/2012 | Sirpal et al. | |
| 2012/0084725 A1 | 4/2012 | Sirpal et al. | |
| 2012/0084736 A1 | 4/2012 | Sirpal | |
| 2012/0084737 A1 | 4/2012 | Gimpl et al. | |

FOREIGN PATENT DOCUMENTS

| | | |
|---|---|---|
| WO | WO 2010/010835 | 1/2010 |
| WO | WO 2010/028406 | 3/2010 |

OTHER PUBLICATIONS http://www.wp7connect.com/2011/07/09/microsoft-patents-dual-screen-phone-from-the-future-video-pics/.*
http://walyou.com/connect-the-brix-phones-together-for-a-larger-media-screen/.*
U.S. Appl. No. 13/187,026, filed Jul. 20, 2011, Chen.
U.S. Appl. No. 13/629,085, filed Sep. 27, 2012, Reeves et al.
U.S. Appl. No. 13/629,173, filed Sep. 27, 2012, Reeves et al.
"Lapdock™ for Motorola Atrix," at http://www.motorola.com/Consumers/US-EN/Consumer-Product-and-Services/Mobile . . . , accessed Apr. 18, 2011, 1 page.
"Motorola Atrix 4G Laptop Dock Review," at http://www.phonearena.com/reviews/Motorola-ATRIX-4G-Laptop-Dock-Review_id2667, Mar. 2, 2011, 6 pages.
Burns, C., "Motorola Atrix 4G Laptop Dock Review," at http://androidcommunity.com/motorola-atrix-4g-laptop-dock-review-20110220/, Feb. 20, 2011, 5 pages.
Google images, accessed Apr. 18, 2011, 6 pages.
Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Website entitled, "Sony Tablet," at store.sony.com/webapp/wcs/stores/servlet/CategoryDisplay?catalogId=10551&storeId=10151&langId=-1&categoryId=8198552921644795521, 2011, 3 pages.

(56) References Cited

OTHER PUBLICATIONS

Website entitled, "Kyocera Echo," at www.echobykyocera.com/, 2011, 6 pages.
International Search Report and Written Opinion for International (PCT) Patent Application No. PCT/US11/53937, mailed Feb. 27, 2012 11 pages.
International Search Report and Written Opinion for International (PCT) Patent Application No. PCT/US2011/053771, mailed Feb. 24, 2012 9 pages.
International Search Report and Written Opinion for International (PCT) Patent Application No. PCT/US2011/053773, mailed Feb. 14, 2012 11 pages.
International Search Report and Written Opinion for International (PCT) Patent Application No. PCT/US11/53776, mailed Feb. 13, 2012 8 pages.
International Search Report and Written Opinion for International (PCT) Patent Application No. PCT/US11/53779, mailed Feb. 13, 2012 7 pages.
International Search Report and Written Opinion for International (PCT) Patent Application No. PCT/US11/53781, mailed Feb. 13, 2012 8 pages.
International Search Report for International (PCT) Patent Application No. PCT/US2011/052932, mailed Apr. 27, 2012 3 pages.
International Search Report for International (PCT) Patent Application No. PCT/US2011/053032, mailed Apr. 27, 2012 3 pages.
International Search Report for International (PCT) Patent Application No. PCT/US2011/052815, mailed Apr. 27, 2012 3 pages.
International Search Report for International (PCT) Patent Application No. PCT/US2011/052802, mailed Apr. 27, 2012 4 pages.
Official Action for U.S. Appl. No. 13/247,977, mailed Mar. 26, 2014 17 pages.
Official Action for U.S. Appl. No. 13/223,697, mailed Apr. 1, 2014, 23 pages.
Final Action for U.S. Appl. No. 12/948,676, mailed Apr. 24, 2014 15 pages.
Official Action for U.S. Appl. No. 12/948,684, mailed May 9, 2014 8 pages.
Notice of Allowance for U.S. Appl. No. 13/187,026, mailed Mar. 10, 2014 8 pages.
Final Action for U.S. Appl. No. 13/223,747, mailed Dec. 18, 2013 22 pages.
Final Action for U.S. Appl. No. 13/223,809, mailed Nov. 20, 2013, 20 pages.
Final Action for U.S. Appl. No. 13/223,727, mailed Nov. 20, 2013, 13 pages.
Final Action for U.S. Appl. No. 13/223,697, mailed Dec. 2, 2013, 23 pages.
Official Action for U.S. Appl. No. 13/187,026, mailed Nov. 20, 2013 10 pages.
Bretzner et al., "Hand Gesture Recognition using Multi-Scale Colour Features, Hierarchical Models and Particle Filtering," Proceedings Fifth IEEE Conference on Automatic Face and Gesture Recognition, 2002, pp. 1-6.
International Preliminary Report on Patentability for International (PCT) Patent Application No. PCT/US11/53937, mailed Apr. 11, 2013 10 pages.
International Preliminary Report on Patentability and Written Opinion for International (PCT) Patent Application No. PCT/US2011/053771, mailed Apr. 11, 2013 8 pages.
International Preliminary Report on Patentability for International (PCT) Patent Application No. PCT/US2011/053773, mailed Apr. 11, 2013 12 pages.
International Preliminary Report on Patentability for International (PCT) Patent Application No. PCT/US11/53776, mailed Apr. 11, 2013 7 pages.
International Preliminary Report on Patentability for International (PCT) Patent Application No. PCT/US11/53779, mailed Apr. 11, 2013 6 pages.

International Preliminary Report on Patentability for International (PCT) Patent Application No. PCT/US11/53781, mailed Apr. 11, 2013 7 pages.
International Preliminary Report on Patentability and Written Opinion for International (PCT) Patent Application No. PCT/US2011/052932, mailed Apr. 11, 2013 7 pages.
International Preliminary Report on Patentability and Written Opinion for International (PCT) Patent Application No. PCT/US2011/053032, mailed Apr. 11, 2013 5 pages.
International Preliminary Report on Patentability and Written Opinion for International (PCT) Patent Application No. PCT/US2011/052815, mailed Apr. 11, 2013 6 pages.
International Preliminary Report on Patentability and Written Opinion for International (PCT) Patent Application No. PCT/US2011/052802, mailed Apr. 11, 2013 7 pages.
Official Action for U.S. Appl. No. 13/247,977, mailed Apr. 2, 2013 22 pages.
Final Action for U.S. Appl. No. 13/247,977, mailed Aug. 1, 2013 17 pages.
Official Action for U.S. Appl. No. 13/223,747, mailed May 31, 2013 22 pages.
Official Action for U.S. Appl. No. 13/223,674, mailed Nov. 20, 2012 19 pages.
Final Action for U.S. Appl. No. 13/223,674, mailed Jun. 7, 2013 21 pages.
Official Action for U.S. Appl. No. 13/223,809, mailed May 1, 2013, 17 pages.
Official Action for U.S. Appl. No. 13/223,727, mailed May 14, 2013, 11 pages.
Official Action for U.S. Appl. No. 13/223,697, mailed May 21, 2013, 23 pages.
Official Action for U.S. Appl. No. 12/948,676, mailed Oct. 11, 2012 8 pages.
Final Action for U.S. Appl. No. 12/948,676, mailed May 9, 2013 12 pages.
Official Action for U.S. Appl. No. 12/948,676, mailed Sep. 26, 2013 11 pages.
Official Action for U.S. Appl. No. 12/948,684, mailed Dec. 20, 2012 12 pages.
Final Action for U.S. Appl. No. 12/948,684, mailed Mar. 29, 2013 13 pages.
Official Action for U.S. Appl. No. 12/948,684, mailed Sep. 26, 2013 12 pages.
Official Action for U.S. Appl. No. 13/187,026, mailed Jun. 18, 2013 5 pages.
Notice of Allowance for U.S. Appl. No. 13/247,822, mailed Oct. 2, 2013, 15 pages.
Official Action for U.S. Appl. No. 13/223,747, mailed Jun. 10, 2014, 25 pages.
Official Action for U.S. Appl. No. 13/223,809, mailed Jun. 16, 2014, 18 pages.
Official Action for U.S. Appl. No. 13/223,727, mailed Jun. 16, 2014, 13 pages.
Official Action for U.S. Appl. No. 13/629,173, mailed May 22, 2014, 14 pages.
Extended European Search Report and Search Opinion for European Patent Application No. 11829763.9, mailed Jun. 26, 2014 7 pages.
European Search Report for European Patent Application No. 11829844.7, mailed Jul. 16, 2014, 9 pages.
Official Action for U.S. Appl. No. 13/223,674, mailed Aug. 1, 2014 24 pages.
Final Action for U.S. Appl. No. 13/247,977, mailed Oct. 23, 2014 20 pages.
Notice of Allowance for U.S. Appl. No. 13/223,747, mailed Dec. 3, 2014 8 pages.
Notice of Allowance for U.S. Appl. No. 13/223,674, mailed Nov. 26, 2014 13 pages.
Notice of Allowance for U.S. Appl. No. 13/223,727, mailed Nov. 20, 2014 8 pages.

(56) References Cited

OTHER PUBLICATIONS

Final Action for U.S. Appl. No. 13/223,697, mailed Oct. 14, 2014 16 pages.
Official Action for U.S. Appl. No. 13/629,085, mailed Sep. 12, 2014 10 pages.
Final Action for U.S. Appl. No. 13/629,173, mailed Sep. 12, 2014 17 pages.
Official Action for U.S. Appl. No. 12/948,675, mailed Oct. 31, 2014 15 pages.
Official Action for U.S. Appl. No. 12/948,684, mailed Oct. 3, 2014 18 pages.

* cited by examiner

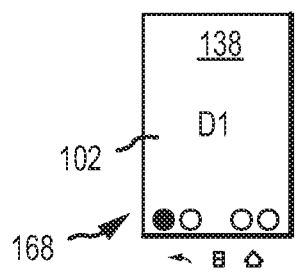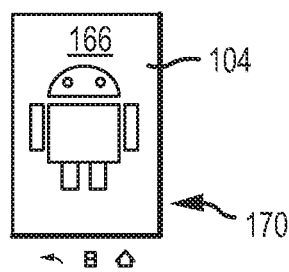
FIG.3A  FIG.3B
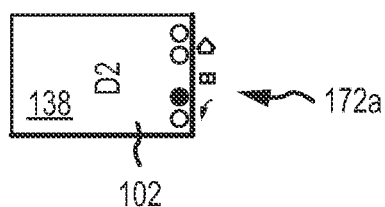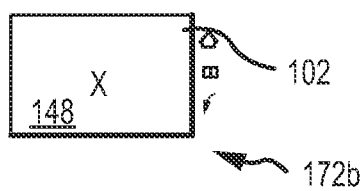
FIG.3C  FIG.3D
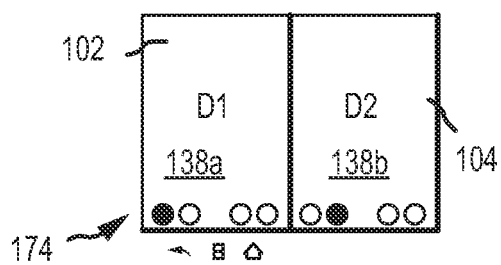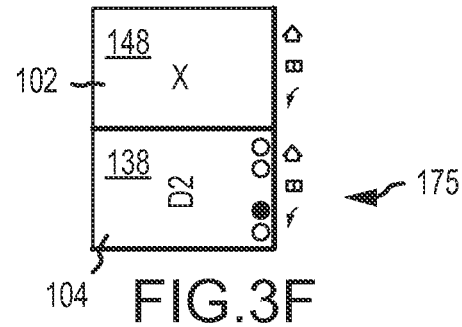
FIG.3E  FIG.3F

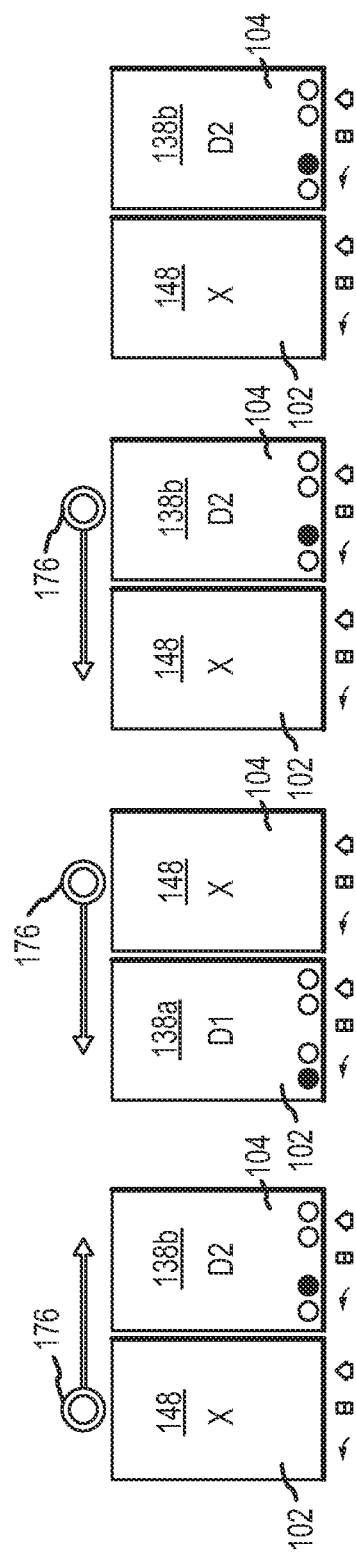

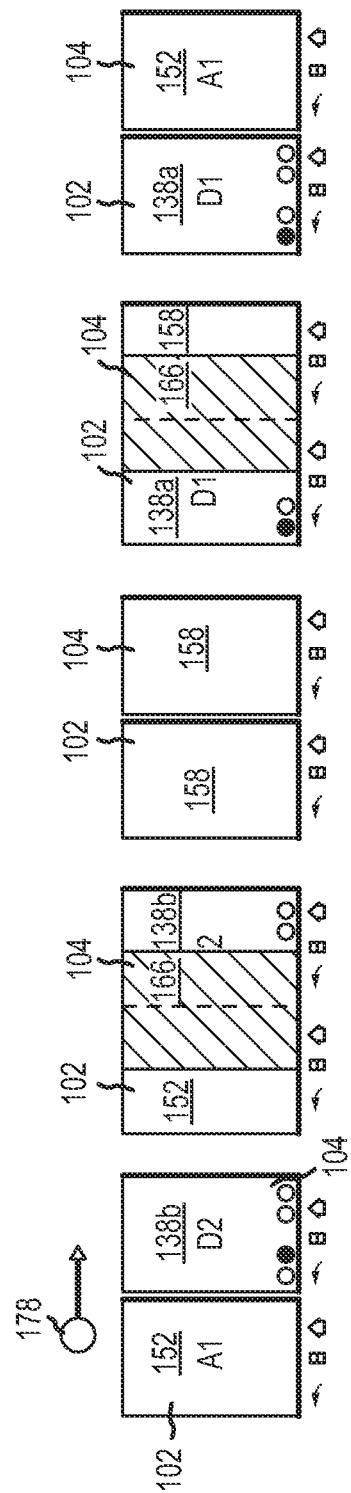

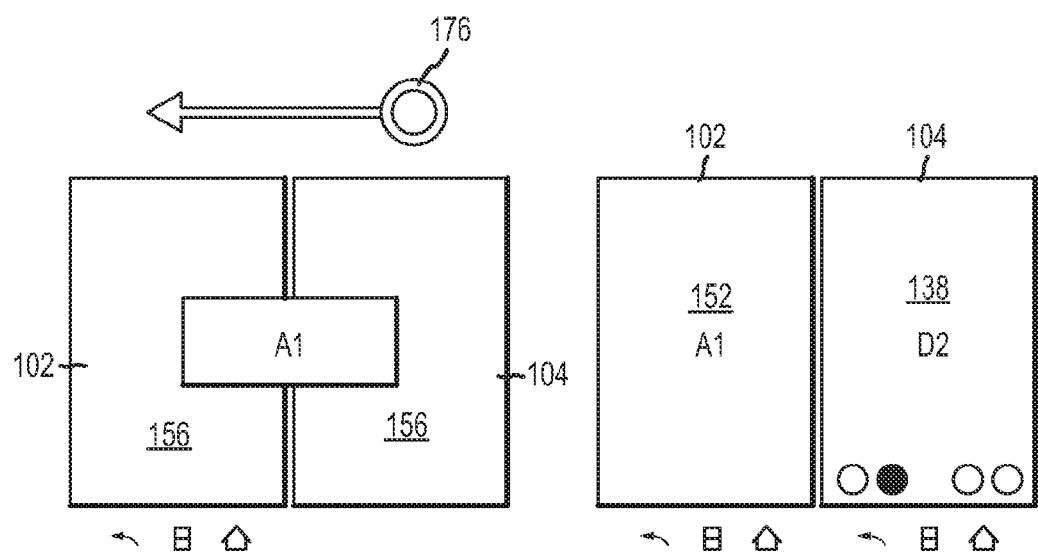

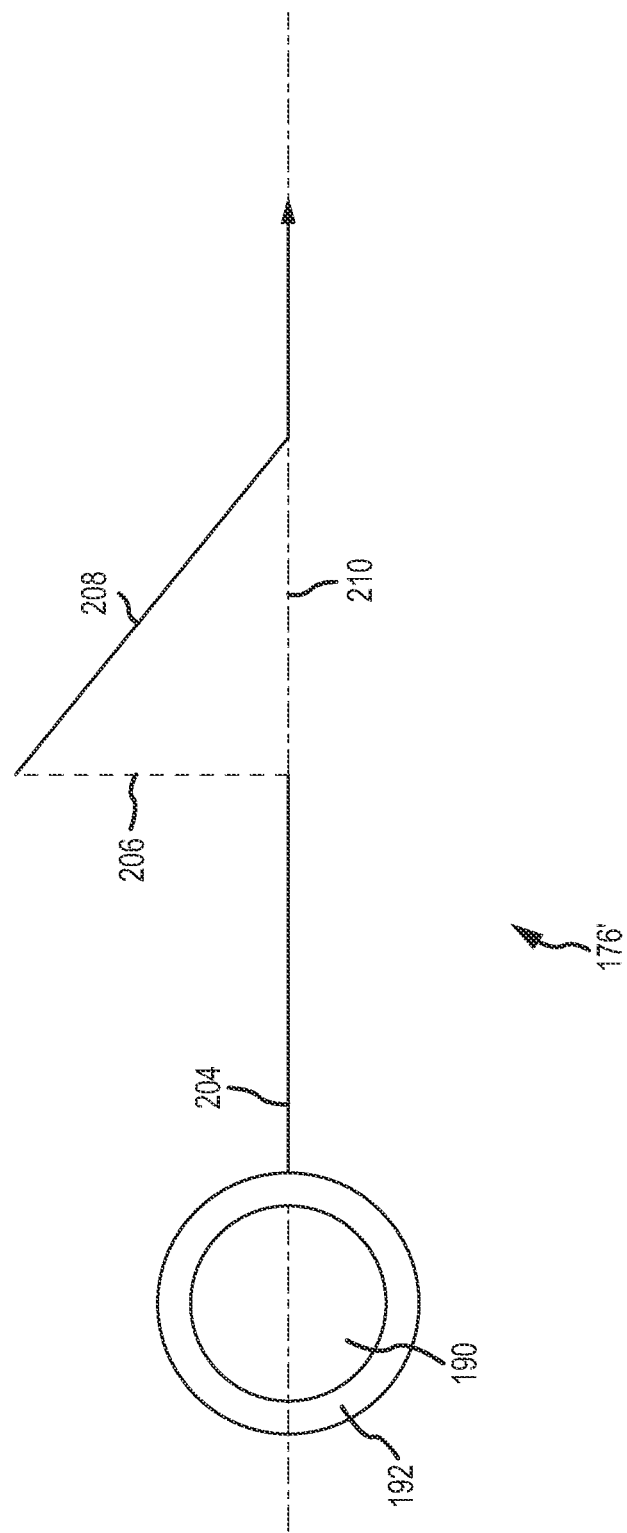

GESTURE CONTROLS FOR MULTI-SCREEN USER INTERFACE

RELATED APPLICATIONS

This application claims priority to U.S. Provisional Application Ser. No. 61/389,000, filed Oct. 1, 2010, entitled "DUAL DISPLAY WINDOWING SYSTEM"; Provisional Application Ser. No. 61/389,117, filed Oct. 1, 2010, entitled "MULTI-OPERATING SYSTEM PORTABLE DOCKING DEVICE"; and Provisional Application Ser. No. 61/389,087, filed Oct. 1, 2010, entitled "TABLET COMPUTING USER INTERFACE". Each and every part of the foregoing provisional applications is hereby incorporated by reference in their entirety.

BACKGROUND

As the computing and communication functions of handheld computing devices become more powerful, the user interface and display elements of such devices have evolved by attempting to adapt user interface regimes developed for personal computers for use with handheld computing devices. However, this attempt to adapt prior user interface regimes has been met with various hurdles.

For instance, the majority of current handheld computing devices make use of a physical keypad for user interface. Many different implementations of physical keypads exist that vary in orientation and relationship to the device screen. However, in every case the physical keypads take up a certain percentage of the physical space of the device and increase the weight of the device. In addition to the disadvantages of size and weight, physical keypads are not configurable in the same manner as a touch screen based user interface. While certain limited forms of physical keypads currently have, on the keys themselves, configurable displays, such as eInk or OLED surfaces, to allow for reconfiguration of the keys, even in these cases, the physical layout of keys is not modifiable. Rather, only the values associated with the physical keys on the keypad may be changed.

Other methods may provide increased user configurability of physical keypads. These methods may include stickers and/or labels that can be added to keys to reference modified functions or plastic overlays on top of the keypad denoting different functional suites. For instance, the ZBoard keyboard, meant for laptop or desktop computer use, incorporates a dual layered physical keyboard which separates the keys and their layout from the connections which send signals to the machine. As such, different physical keyboard inserts for different applications can be inserted into a holder allowing full configurability such that the orientation and layout of the keys in addition to their denotation of function is configurable. This model could be extended to handheld computing devices; however, the rate at which such a modular keypad can change functions is much slower than a touch screen user interface. Furthermore, for each potential functional suite, an additional physical key layout must be carried by the user, greatly increasing the overall physical size and weight of such implementations. One advantage of a physical keypad for handheld computing devices is that the user input space is extended beyond the user display space such that none of the keys themselves, the housing of the keys, a user's fingers, or a pointing device obscure any screen space during user interface activities.

A substantial number of handheld computing devices make use of a small touch screen display to deliver display information to the user and to receive inputs from the user interface commands. In this case, while the configurability of the device may be greatly increased and a wide variety of user interface options may be available to the user, this flexibility comes at a price. Namely, such arrangements require shared screen space between the display and the user interface. While this issue is shared with other types of touch screen display/user interface technology, the small form factor of handheld computing devices results in a tension between the displayed graphics and area provided for receiving inputs. For instance, the small display further constrains the display space, which may increase the difficulty of interpreting actions or results while a keypad or other user interface scheme is laid overtop or to the side of the applications in use such that the application is squeezed into an even smaller portion of the display. Thus a single display touch screen solution, which solves the problem of flexibility of the user interface may create an even more substantial set of problems of obfuscation of the display, visual clutter, and an overall conflict of action and attention between the user interface and the display.

Single display touch screen devices thus benefit from user interface flexibility, but are crippled by their limited screen space such that when users are entering information into the device through the display, the ability to interpret information in the display can be severely hampered. This problem is exacerbated in several key situations when complex interaction between display and interface is required, such as when manipulating layers on maps, playing a game, or modifying data received from a scientific application. This conflict between user interface and screen space severely limits the degree to which the touch based user interface may be used in an intuitive manner.

SUMMARY

A first aspect includes a method for controlling a plurality of displays of a handheld computing device. The method includes executing an application on the handheld computing device such that a screen of the application is displayed in a first display of the plurality of displays. The method further includes receiving a first gesture input at a gesture sensor of the handheld computing device. The method also includes modifying the plurality of displays in response to the first gesture input such that the screen is displayed in at least a second display of the plurality of displays.

A second aspect includes a method for controlling a plurality of displays of a handheld computing device. The method of the second aspect includes executing an application on the handheld computing device such that one or more screens of the application is displayed in a first display and a second display of said handheld computing device. The method further includes receiving a gesture input at a gesture sensor of the handheld computing device. The method also includes modifying the plurality of displays in response to the gesture input such that the application is displayed in the first display of the handheld computing device and not in the second display.

A number of feature refinements and additional features are applicable to the first and second aspects. These feature refinements and additional features may be used individually or in any combination. As such, each of the following features that will be discussed may be, but are not required to be, used with any other feature or combination of features of the aspects presented herein.

In one embodiment, the first gesture input may be directional (e.g., from right to left, left to right, etc.). In this regard, the second display may be located in a direction with respect to the first display that corresponds to the direction of the first gesture. The modifying may include constrained movement of the screen linearly between the first display and the second display (e.g., corresponding to the direction of the gesture).

In another embodiment, the screen may occupy a single display and the modifying may include moving the screen from the first display to the second display. An underlying screen that is obscured by the screen in the first display may be revealed upon the modifying, and a view visible in the second display may be obscured by the screen after the modifying.

In still another embodiment, the application may be expandable to occupy multiple displays and the modifying may include expanding the application such that one or more screens corresponding to the application occupy both the first display and the second display. For instance, the expanding may include moving a node screen of the application to the second display while maintaining a parent screen of the application in the first display. Additionally or alternatively, the expanding may include scaling the application to occupy the first and second display. Further still, the expanding may include enlarging the viewable area of the application into the second display.

In another embodiment, the method may include receiving a second gesture input at the gesture sensor such that the screen is moved from the first display to the second display in response to the second gesture input.

In yet another embodiment, the handheld computing device may be in operative communication with an external display. In this regard, the method may further include relocating the screen from the first display to the external display. Once the screen has been relocated to the external display, the screen may be unconstrainably moveable about the external display.

In one embodiment, the gesture sensor may be a touch sensitive device. For instance, the touch sensitive device may be separate from and non overlapping with respect to the first display or the second display. That is, the touch sensitive device may be provided as a separate device with a different (e.g., completely separate) footprint than the first or second displays. Additionally or alternatively, the touch sensitive device may be a touch screen display including at least one of the first or second displays.

BRIEF DESCRIPTION OF THE DRAWINGS

FIGS. 3A-K are graphical representations of an embodiment of a handheld computing device provided in different positions, orientations, and instances of operation.

FIGS. 5A-D are a graphical representations of an embodiment of a handheld computing device functioning in response to a gesture input.

FIGS. 7A-E are graphical representations of yet another embodiment of a handheld computing device functioning in response to a gesture input.

FIGS. 8A-B are graphical representations of another embodiment of a handheld computing device functioning in response to a gesture input.

FIG. 11 is a graphical representation of an embodiment of a gesture input.

DETAILED DESCRIPTION

The present disclosure is generally related to gesture inputs for interaction with a computing device. The interface controls are particularly suited for control of devices that have one or more displays capable of displaying graphical user interfaces (GUIs) on a handheld portable device. The following disclosure may, in various embodiments, be applied to other computing devices capable of displaying and responding to a GUI (e.g., laptop computers, tablet computers, desktop computers, touch screen monitors, etc.) and is not intended to be limited to handheld computing devices unless otherwise explicitly specified.

Figure 1:
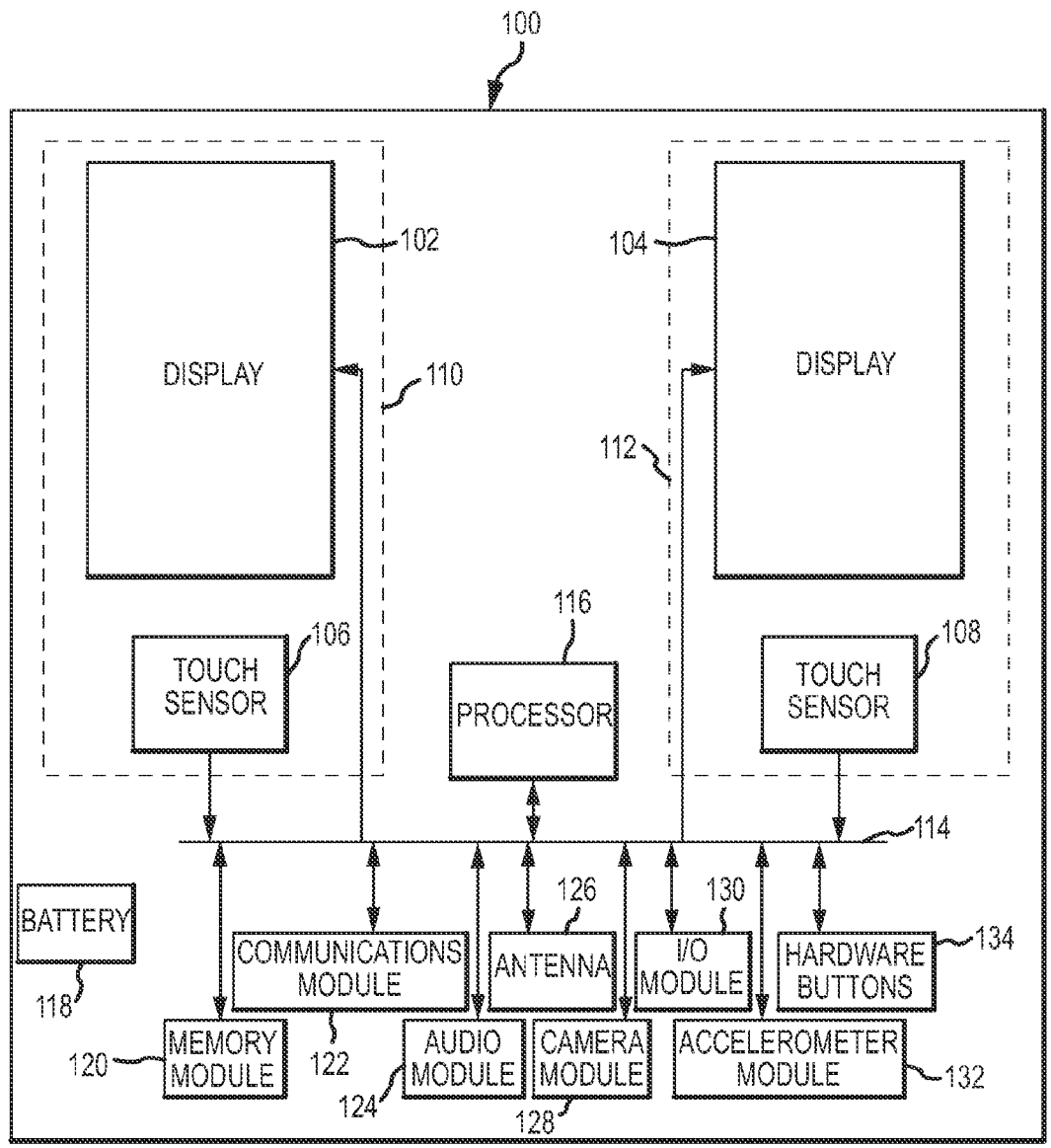
FIG. 1 is a schematic view of an embodiment of a handheld computing device.

FIG. 1 depicts an embodiment of a handheld computing device 100. The handheld computing device 100 may include a first display 102 and a second display 104. Additionally, while two displays (102, 104) may be shown and described below with regard to the functionality of various embodiments of handheld computing devices, a handheld computing device may be provided that includes more than two displays. In any regard, the first display 102 and the second display 104 may be independently controllable. The displays may be operative to display a displayed image or "screen". As used herein, the term "display" is intended to connote device hardware, whereas "screen" is intended to connote the displayed image produced on the display. In this regard, a display is a physical hardware that is operable to render a screen. A screen may encompass a majority of the display. For instance, a screen may occupy substantially all of the display area except for areas dedicated to other functions (e.g., menu bars, status bars, etc.) A screen may be associated with an application and/or an operating system executing on the handheld computing device 100. For instance, application screens or desktop screens may be displayed. An application may have various kinds of screens that are capable of being manipulated as will be described further below. In an embodiment, each display may have a resolution of 480 pixels by 800 pixels, although higher and lower resolution displays may also be provided.

A screen may be associated with an operating system, an application, or the like. In some instances, a screen may include interactive features (e.g., buttons, text fields, toggle fields, etc.) capable of manipulation by way of a user input. The user input may be received by various input devices (e.g., a physical keyboard, a roller ball, directional keys, a touch sensitive device, etc.). In some instances, a screen may simply include graphics and have no ability to receive an input by a user. In other instances, graphics features and input features may both be provided by a screen. As such, the one or more displays of a handheld computing device, the screens displayed on the one or more displays, and various user input devices may comprise a GUI that allows a user to exploit functionality of the handheld computing device.

The handheld computing device 100 may be configurable between a first position and a second position. In the first position, a single display (e.g., the first display 102 or the second display 104) may be visible from the perspective of a user. Both displays 102, 104 may be exposed on an exterior of the handheld device 100 when in the first position, but the displays 102, 104 may be arranged in a non-adjacent manner such that both displays 102, 104 are not concurrently visible from the perspective of a user (e.g., one display may be visible from the front of the device 100 and the other display may be visible from the back of the device 100).

The handheld computing device 100 may also be provided in the second position such that the displays 102, 104 may be concurrently viewable from the perspective of a user (e.g., the displays 102, 104 may be positioned adjacent to one another). The displays 102, 104 may be displayed in the second position such that the displays 102, 104 are arranged end-to-end or side-by-side. Additionally, the displays 102, 104 may be arranged in a portrait orientation or a landscape orientation with respect to a user. As will be discussed further below, a portrait orientation is intended to describe an arrangement of the handheld computing device, wherein the longer dimension of the display of the handheld computing device is vertically oriented (e.g., with respect to gravity or the perspective of a user). A landscape orientation is intended to describe an arrangement wherein the shorter dimension of the display of the handheld computing device is vertically oriented (e.g., with respect to gravity or the perspective of a user). Furthermore, the longer dimension and shorter dimension may refer to each display individually or the combined viewing area of the one or more displays of the device. Thus, when the individual displays are arranged in a portrait orientation, the overall display area may be arranged in a landscape orientation, and vice versa. Additionally, the displays and screens may be in different respective orientations. For instance, when the displays are in a landscape orientation, one or more screens may be rendered in a portrait orientation on the displays.

The handheld computing device 100 may be manipulated between the first position (i.e., a single display visible from a user's perspective) and the second position (i.e., at least two displays concurrently visible from the user's perspective) in a variety of manners. For instance, the device 100 may include a slider mechanism such that the first and second displays 102, 104 are disposable adjacent to one another in a parallel fashion in a second position and slideable to the first position where only a single display is viewable and the other display is obscured by the viewable display.

Alternatively, the device 100 may be arranged in a clam shell type arrangement wherein a hinge is provided between the first display 102 and the second display 104 such that the displays 102, 104 are concurrently visible by a user when in the second position (i.e., an open position). The displays 102, 104 may be provided on an interior clam shell portion or an exterior clam shell portion of the device 100. In this regard, both displays 102, 104 may be visible from the front and the back of the device, respectively, when the device is in the first position (i.e., the closed position). When the device 100 is in the open position, the displays 102, 104 may be provided adjacent and parallel to one another. Alternative arrangements of the handheld computing device 100 are contemplated wherein different arrangements and/or relative locations of the displays may be provided when in the first and second position.

In addition, the first display 102 and the second display 104 may be provided as entirely separate devices. In this regard, a user may manipulate the displays 102, 104 such that they may be positioned adjacent to one another (e.g., side-by-side or end-to-end). The displays 102, 104 may be in operative communication when adjacently positioned such that the displays 102, 104 may operate in the manner provided in greater detail below when adjacently positioned (e.g., via physical contacts, wireless communications, etc.). A retention member (not shown) may be provided to retain the separate displays 102, 104 in an adjacent position. For instance, the retention member may include coordinating magnets, mechanical clips or fasteners, elastic members, etc.

While the foregoing has referenced two displays 102 and 104, alternate embodiments of a handheld device may include more than two displays. In this regard, the two or more displays may behave in a manner in accordance with the foregoing wherein only a single display is viewable by a user in a first position and multiple displays (i.e., more than two displays) are viewable in a second position. Additionally, in one embodiment, the two displays 102 and 104 may comprise separate portions of a unitary display. As such, the first display 102 may be a first portion of the unitary display and the second display 104 may be a second portion of the unitary display. For instance, the handheld computing device 100 (e.g., having a first and second display 102 and 104) may be operatively connected to the unitary display (e.g., via a connector or a dock portion of the unitary display) such that the first display 102 and the second display 104 of the handheld computing device 100 are emulated on the unitary display. As such, the unitary display may have first and second portions corresponding to and acting in a similar manner to the first and second display 102 and 104 of the handheld computing device 100 described below.

The handheld computing device 100 may further include one or more input devices that may be used to receive user inputs. These input devices may be operative to receive gesture inputs from a user, and, accordingly, may be referred to generally as gesture sensors. A number of different types of gesture sensors may be provided. Some examples include, but are not limited to traditional input devices (keypads, trackballs, etc.), touch sensitive devices, optical sensors (e.g., a camera or the like), etc. The discussion contained herein may reference the use of touch sensitive devices to receive gesture inputs. However, the use of touch sensitive devices is not intended to limit the means for receiving gesture inputs to touch sensitive devices alone and is provided for illustrative purposes only. Accordingly, any of the foregoing means for receiving a gesture input may be used to produce the functionality disclosed below with regard to gesture inputs received at touch sensitive devices.

In this regard, the handheld computing device 100 may include at least a first touch sensor 106. Furthermore, the handheld computing device may include a second touch sensor 108. The first touch sensor 106 and/or the second touch sensor 108 may be touchpad devices, touch screen devices, or other appropriate touch sensitive devices. Examples include capacitive touch sensitive panels, resistive touch sensitive panels, or devices employing other touch sensitive technologies. The first touch sensor 106 and/or second touch sensor 108 may be used in conjunction with a portion of a user's body (e.g., finger, thumb, hand, etc.), a stylus, or other acceptable touch sensitive interface mechanisms known in the art. Furthermore, the first touch sensor 106 and/or the second touch sensor 108 may be multi-touch devices capable of sensing multiple touches simultaneously.

The first touch sensor 106 may correspond to the first display 102 and the second touch sensor 108 may correspond to the second display 104. In one embodiment of the handheld computing device 100, the first display 102 and the first touch sensor 106 comprise a first touch screen display 110. In this regard, the first touch sensor 106 may be transparent or translucent and positioned with respect to the first display 102 such that a corresponding touch received at the first touch sensor 106 may be correlated to the first display 102 (e.g., to interact with a screen rendered on the first display 102). Similarly, the second display 104 and the second touch sensor 108 may comprise a second touch screen display 112. In this regard, the second touch sensor 108 may be positioned with respect to the second display 104 such that a touch received at the second touch sensor 108 may be correlated to the second display 104 (e.g., to interact with a screen rendered on the second display 104). Alternatively, the first touch sensor 106 and/or the second touch sensor 108 may be provided separately from the displays 102, 104. Furthermore, in an alternate embodiment, only a single touch sensor may be provided that allows for inputs to control both the first display 102 and the second display 104. The single touch sensor may also be provided separately or integrally with the displays.

In this regard, the first and second touch sensors 106, 108 may have the substantially same footprint on the handheld computing device 100 as the displays 102, 104. Alternatively, the touch sensors 106, 108 may have a footprint including less of the entirety of the displays 102, 104. Further still, the touch sensors 106, 108 may include a footprint that extends beyond the displays 102, 104 such that at least a portion of the touch sensors 106, 108 are provided in non-overlapping relation with respect to the displays 102, 104. As discussed further below, the touch sensors 106, 108 may alternatively be provided in complete non-overlapping relation such that the footprint of the touch sensors 106, 108 is completely different than the footprint of the displays 102, 104.

Figure 9A:
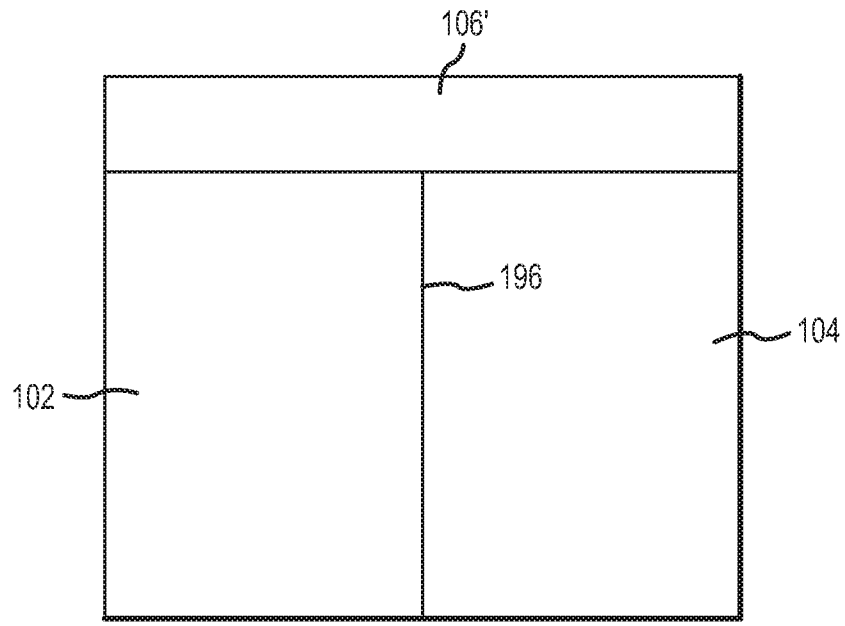
FIGS. 9A-B are schematic views of embodiments of a handheld computing device provided with touch sensitive devices.
Figure 9B:
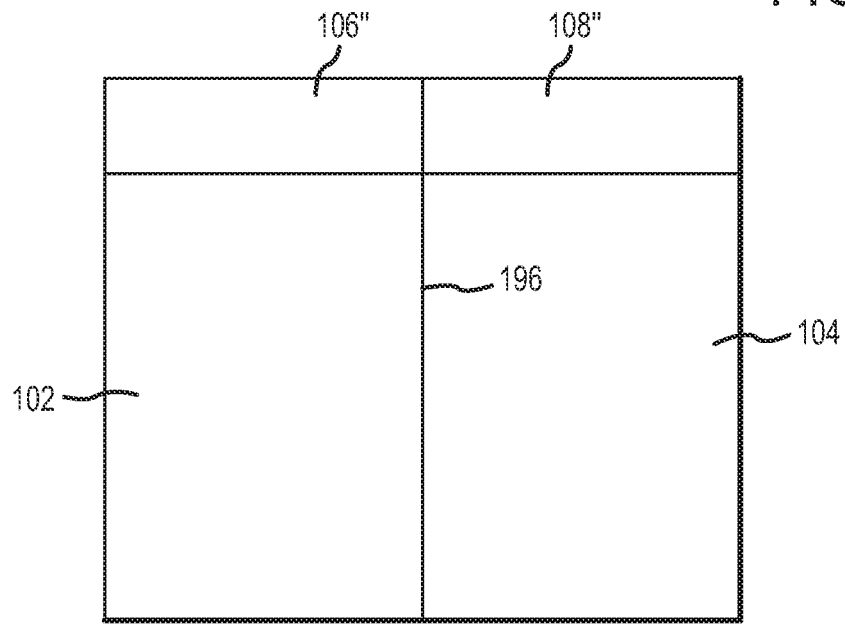

With reference to FIGS. 9A-B, various potential arrangements are depicted for the first display 102, the second display 104, and touch sensors 106', 106", and 108". In FIG. 9A, the first 102 and second display 104 are arranged side-by-side such that a crease 196 separates the displays. In this regard, the first display 102 and second display 104 may be arranged in a clam-shell type arrangement such that the crease 196 includes a hinge that allows for pivotal movement between the first display 102 and second display 104 as discussed above. A touch sensor 106' may span the width of both the first display 102 and the second display 104. In this regard, the touch sensor 106' may span the crease 196 without interruption. Alternatively, as shown in FIG. 9B, separate touch sensors 106" and 108" may be provided on either side of the crease 196. In this regard, each of the touch sensors 106" and 108" may span the width of each of the first display 102 and second display 104, respectively.

In any of the arrangements shown in FIGS. 9A-B, the displays (102, 104) may also comprise touch screen displays that may be used in conjunction with touch sensitive portions that are provided separately from the touch screen displays. Thus, displays 102 and 104 may both comprise touch screen displays and be provided in addition to touch sensitive devices 106', 106", and 108". Accordingly, a combination of touch screen displays (e.g., 110, 112) and off display touch sensors (e.g., 106', 106", 108") may be provided for a single device. Touch inputs may be received at both a touch screen display (110, 112) and off display touch sensor (106', 106", 108"). In this regard, gestures received at an off screen display sensor may have a different functionality than the same gesture received at a touch screen display. Also, a touch sensitive device may be divided into a plurality of zones. The same gesture received in different zones may have different functionality. For instance, a percentage (e.g., 10%, 25%, etc.) of the touch sensitive device at the top or bottom of the display may be defined as a separate zone than the remainder of the touch sensitive device. Thus, a gesture received in this zone may have a different functionality than a gesture received in the remainder of the touch sensitive device.

The handheld computing device 100 may further include a processor 116. The processor 116 may be in operative communication with a data bus 114. The processor 116 may generally be operative to control the functionality of the handheld device 100. For instance, the processor 116 may execute an operating system and be operative to execute applications. The processor 116 may be in communication with one or more additional components 120-134 of the handheld computing device 100 as will be described below. For instance, the processor 116 may be in direct communication with one more of the additional components 120-134 or may communicate with the one or more additional components via the data bus 114. Furthermore, while the discussion below may describe the additional components 120-134 being in operative communication with the data bus 114, it will be understood that in other embodiments, any of the additional components 120-134 may be in direct operative communication with any of the other additional components 120-134. Furthermore, the processor 116 may be operative to independently control the first display 102 and the second display 104 and may be operative to receive input from the first touch sensor 106 and the second touch sensor 108, the processor 116 may comprise one or more different processors. For example, the processor 116 may comprise one or more application specific integrated circuits (ASICs), one or more field-programmable gate arrays (FPGAs), one or more general purpose processors operative to execute machine readable code, or a combination of the foregoing.

The handheld computing device may include a battery 118 operative to provide power to the various devices and components of the handheld computing device 100. In this regard, the handheld computing device 100 may be portable.

The handheld computing device 100 may further include a memory module 120 in operative communication with the data bus 114. The memory module 120 may be operative to store data (e.g., application data). For instance, the memory 120 may store machine readable code executable by the processor 116 to execute various functionalities of the device 100.

Additionally, a communications module 122 may be in operative communication with one or more components via the data bus 114. The communications module 122 may be operative to communicate over a cellular network, a Wi-Fi connection, a hardwired connection or other appropriate means of wired or wireless communication. The handheld computing device 100 may also include an antenna 126. The antenna 126 may be in operative communication with the communications module 122 to provide wireless capability to the communications module 122. Accordingly, the handheld computing device 100 may have telephony capability (i.e., the handheld computing device 100 may be a smartphone device).

An audio module 124 may also be provided in operative communication with the data bus 114. The audio module 124 may include a microphone and/or speakers. In this regard, the audio module 124 may be able to capture audio or produce sounds. Furthermore, the device 100 may include a camera module 128. The camera module 128 may be in operative communication with other components of the handheld computing device 100 to facilitate the capture and storage of images or video.

Additionally, the handheld computing device 100 may include an I/O module 130. The I/O module 130 may provide input and output features for the handheld computing device 100 such that the handheld computing device 100 may be connected via a connector or other device in order to provide syncing or other communications between the handheld computing device 100 and another device (e.g., a peripheral device, another computing device etc.).

The handheld computing device 100 may further include an accelerometer module 132. The accelerometer module 132 may be able to monitor the orientation of the handheld computing device 100 with respect to gravity. In this regard, the accelerometer module 132 may be operable to determine whether the handheld computing device 100 is substantially in a portrait orientation or landscape orientation. The accelerometer module 132 may further provide other control functionality by monitoring the orientation and/or movement of the handheld computing device 100.

The handheld computing device 100 may also include one or more hardware buttons 134. The hardware buttons 134 may be used to control various features of the handheld computing device 100. The hardware buttons 134 may have fixed functionality or may be contextual such that the specific function of the buttons changes during operation of the handheld computing device 100. Examples of such hardware buttons may include, but are not limited to, volume control, a home screen button, an end button, a send button, a menu button, etc.

With further reference to FIGS. 2A-D, various screens of an embodiment of a device are shown. The screens shown in FIGS. 2A-D are intended to represent the potential screens that may be displayed. Thus, while multiple screens may be shown, only one or a subset of the multiple screens may be shown on the displays of the device at any one moment. In this regard, a screen may be described in a relative location to the displays or other screens (e.g., to the left of a display, to the right of a display, under another screen, above another screen, etc.). These relationships may be logically established such that no physical display reflects the relative position. For instance, a screen may be moved off a display to the left. While the screen is no longer displayed on the display, the screen may have a virtual or logical position to the left of the display from which it was moved. This logical position may be recognized by a user and embodied in values describing the screen (e.g., values stored in memory correspond to the screen). Thus, when referencing screens in relative locations to other screens, the relationships may be embodied in logic and not physically reflected in the display of the device.

FIGS. 2A-D may display a number of different screens that may be displayed at various instances of operation of a handheld device and are not intended to be presented in any particular order or arrangement. Single screen applications and multi screen applications may be provided. A single screen application is intended to describe an application that is capable of producing a screen that may occupy only a single display at a time. A multi screen application is intended to describe an application that is capable of producing one or more screens that may simultaneously occupy multiple displays. Additionally, a multi screen application may occupy a single display. In this regard, a multi screen application may have a single screen mode and a multi screen mode.

Figure 2A:
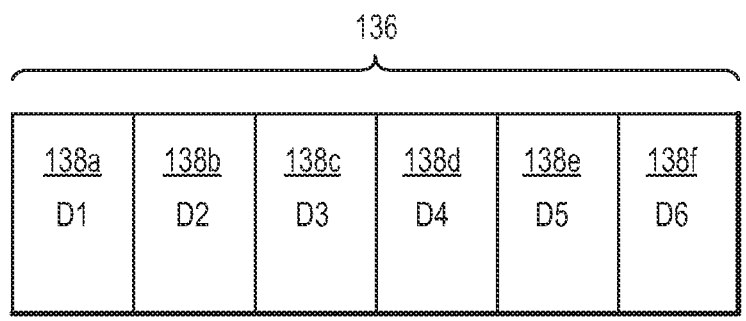
FIGS. 2A-D are graphical representations of an embodiment of a handheld computing device in various instances of operation.

A desktop sequence 136 is displayed in FIG. 2A. The desktop sequence 136 may include a number of individual desktop screens 138*a*-138*f*. Thus, each desktop screen 138 may occupy substantially the entirety of a single display (e.g., the first display 102 or second display 104 of FIG. 1). The desktop screens 138*a*-138*f* may be in a predetermined order such that the desktop screens 138*a*-138*f* appear consecutively and the order in which the desktop screens appear may not be reordered. However, the desktop screens 138*a*-138*f* may be sequentially navigated (e.g., in response to a user input). That is, one or more of the desktop screens 138*a*-138*f* may be sequentially displayed on a handheld device as controlled by a user input.

Figure 2B:
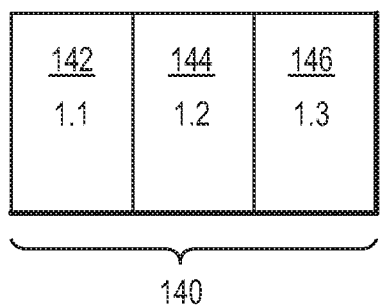
Figure 2C:
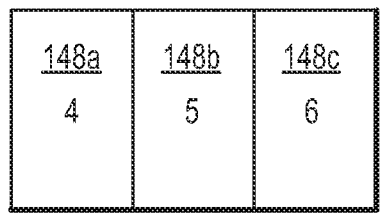

Additionally, FIG. 2B displays a hierarchal application sequence 140 of a multi screen application. The hierarchal application sequence 140 may include a root screen 142, one or more node screens 144, and a leaf screen 146. The root screen 142 may be a top level view of the hierarchical application sequence 140 such that there is no parent screen corresponding to the root screen 142. The root screen 142 may be a parent to a node screen 144. One or more node screens 144 may be provided that are related as parent/children. A node screen may also serve as a parent to a leaf screen 146. By leaf screen 146, it is meant that the leaf screen 146 has no corresponding node screen for which the leaf screen 146 is a parent. As such, the leaf screen does not have any children node screens 144. FIG. 2C depicts various single screen applications 148*a*, 148*b*, and 148*c* arranged sequentially. Each of these single screen applications may correspond to a different executing application. For instance, in FIG. 2C Application 4, Application 5, and Application 6 may be executing on the device and correspond to each single screen 148*a*, 148*b*, and 148*c*, respectively.

Figure 2D:
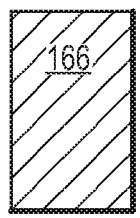

FIG. 2D also includes an empty view 166. The empty view 166 may be used during transitions of a screen (e.g., movement of screen between a first display and a second display). It is not necessary that the empty view 166 be interpretable by the user as an effective GUI screen. The empty view 166 merely communicates to the user that an action regarding the screen (e.g., the movement of the screen with respect to one or more displays) is occurring. An application displaying an empty view 166 need not be able to rest, wait, process or interpret input. The empty view 166 may display a screen, or a representation thereof, as it is being moved in proportion to the amount of the screen that has been moved from a first display to a second display as will be discussed in greater detail below. In this regard, the empty view 166 may be used to relate information regarding the position of a screen during a transition of the screen (e.g., in response to gesture). The empty view 166 may include an animation or the like showing the response of a screen as it is being moved or changed (e.g., modified into or out of a landscape mode).

Figure 3G:
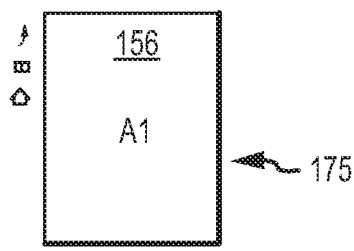
Figure 3H:
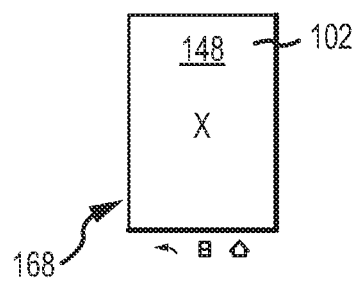

FIGS. 3A-K depict various arrangements and statuses of displays 102, 104 of a device that are possible in various embodiments of a handheld computing device according to the present disclosure. For instance, when in the first (e.g., closed) position, a closed front display 168 may be visible as shown in FIG. 3A. The closed front display 168 may correspond with the first display 102 or the second display 104. The closed front 168 as displayed may be occupied by a desktop screen D1 138 as shown in FIG. 3A. Alternatively, an application with a single screen or a multi screen application in single screen mode may be displayed in the closed front 168. A closed back display 170 may be viewable from an opposite side of the display when the device is in a closed position, as shown in FIG. 3B. The closed back 170 may display a different desktop screen or application screen than the closed front 168 or may simply display an empty view 166 (e.g., displaying an icon or other graphic) and lack functionality as an interface.

FIG. 3C depicts a closed device in a landscape orientation 172*a*. In one embodiment, a landscape mode (i.e., wherein the display is adjusted to display a screen 148 in a landscape orientation) may not be enabled as shown in FIG. 3C. Alternatively, the landscape mode may be enabled such that the screen 148 is modified when the device is sensed in a landscape orientation 172b, such that the screen 148 is rendered in a landscape orientation as shown at FIG. 3D.

The device may further be provided in a second (e.g., open) position 174 as shown in FIG. 3E. In the open position 174, at least two displays 102, 104 are arranged such that the two displays 102, 104 are both visible from the vantage point of a user. The two displays 102, 104 may be arranged in a side-by-side fashion when in the open position 174. Thus, each of the two displays 102, 104 may display separate screens. For instance, the displays 102, 104 may each display a separate desktop screen 138a, 138b, respectively. While the individual displays 102 and 104 are in a portrait orientation as shown in FIG. 3E, it may be appreciated that the full display area (comprising both the first display 102 and the second display 104) may be arranged in a landscape orientation. Thus, whether the device as depicted in FIG. 3E is in a landscape or portrait orientation may depend on whether the displays are being used individually or collectively. If used collectively as a unitary display, the device may be in a landscape orientation, whereas if the displays are used separately, the orientation shown in FIG. 3E may be referred to as a portrait orientation.

Additionally, when the device is in an open position 174 as shown in FIG. 3F, a similar dependency with regard to the use of the screens as a unitary display or separate displays may also affect whether the device is in a portrait orientation or landscape orientation. As can be appreciated, each individual screen is in a landscape orientation, such that if the displays are used separately, the device may be in a landscape orientation. If used as a unitary display, the device may be in a portrait orientation. In any regard, as shown in FIG. 3F, a single screen 148 may occupy a first display 102 and the second display 104 may display a desktop screen 138. The single screen 148 may be displayed in a landscape or portrait mode. Alternatively, a device in an open orientation 172 may display a multi screen GUI 156 that may occupy both displays 102, 104 in a portrait orientation as shown in FIG. 3G such that the individual displays are in a landscape orientation.

Figure 3I:
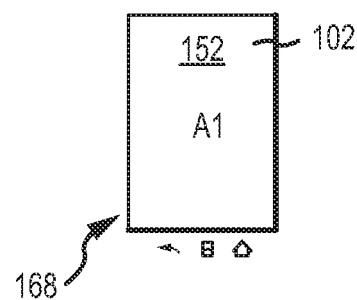
Figure 3J:
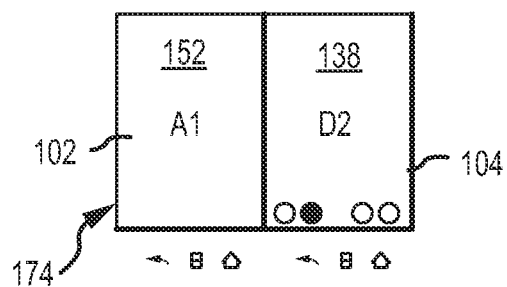
Figure 3K:
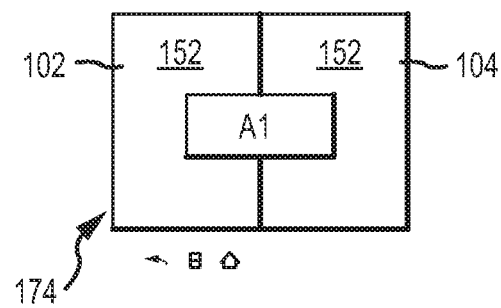

FIGS. 3I-K depict the potential arrangements of the screens of a multi screen application 152. The multi screen application 152 may, in one mode, occupy a single display 102 when the device is in a closed position 168 as shown in FIG. 3I. That is, the multi screen application 152 may be in a single screen mode. Alternatively, when the device is in an open position as shown in FIG. 3J, the multi screen application 152 may still occupy a single display 102 in single screen mode. Furthermore, the multi screen application 152 may be expanded to occupy both displays 102, 104 when the device is in the open position as shown in FIG. 3K. In this regard, the multi screen application 152 may also execute in a multi screen mode. Various options may be provided for expanding the multi screen application 152 from a single screen mode to a multi screen mode.

For example, the multi screen application 152 may be maximized from a single screen mode displayed in a single display to two screens displayed in two displays such that a parent screen is displayed in the first display and a node screen (e.g., a child screen) is expanded into the second display. In this regard, each of the screens displayed in the first and second display may be independent screens that comprise part of a hierarchical application sequence (e.g., as shown in FIG. 2B). Alternatively, the single screen mode of the multi screen application may simply be scaled such that the contents of the single screen are scaled to occupy both displays. Thus, the same content displayed in the single screen is scaled to occupy multiple displays, but no additional viewing area or graphics are presented. Further still, the maximization of the multi screen application from a single screen mode to a multi screen mode may result in the expansion of the viewable area of the application. For example, if a multi screen application is displayed in single screen mode, upon maximization into multi screen mode, the viewable area of the multi-screen application may be expanded while the scale of the graphics displayed remains the same. In this regard, the viewable area of the multi-screen application may be expanded into the second display while the scaling remains constant upon expansion.

In this regard, an application may have configurable functionality regarding the nature and behavior of the screens of the application. For instance, an application may be configurable to be a single screen application or a multi screen application. Furthermore, a multi screen application may be configurable as to the nature of the expansion of the multi screen application between a single screen mode and a multi screen mode. These configuration values may be default values that may be changed or may be permanent values for various applications. These configuration values may be communicated to the device (e.g., the processor 116) to dictate the behavior of the application when executing on the device.

Figure 4:
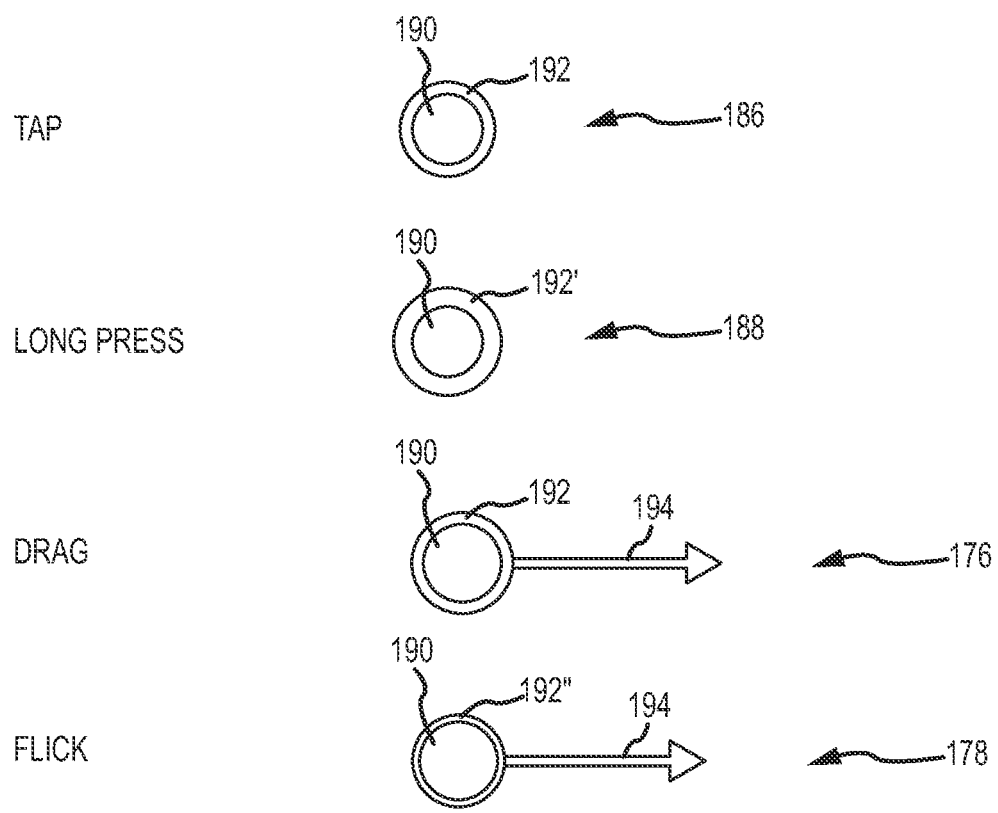
FIG. 4 is a graphical representation of various gesture inputs for controlling a handheld computing device.

FIG. 4 depicts various graphical representations of gesture inputs that may be recognized by a handheld computing device. Such gestures may be received at one or more touch sensitive portions of the device. In this regard, various input mechanisms may be used in order to generate the gestures shown in FIG. 4. For example a stylus, a user's finger(s), or other devices may be used to activate the touch sensitive device in order to receive the gestures. The use of a gesture may describe the use of a truncated input that results in functionality without the full range of motion necessary to conventionally carry out the same functionality. For instance, movement of screens between displays may be carried out by selecting and moving the screen between displays such that the full extent of the motion between displays is received as an input. However, such an implementation may be difficult to accomplish in that the first and second displays may comprise separate display portions without continuity therebetween. As such, a gesture may truncate the full motion of movement or provide an alternative input to accomplish the same functionality. Thus, movement spanning the first and second display may be truncated so that the gesture may be received at a single touch sensitive device. The use of gesture inputs is particularly suited to handheld computing devices in that the full action of an input may be difficult to execute given the limited input and display space commonly provided on a handheld computing device.

With reference to FIG. 4, a circle 190 may represent a touch received at a touch sensitive device. The circle 190 may include a border 192, the thickness of which may indicate the length of time the touch is held stationary at the touch sensitive device. In this regard, a tap 186 has a thinner border 192 than the border 192' for a long press 188. In this regard, the long press 188 may involve a touch that remains stationary on the touch sensitive display for longer than that of a tap 186. As such, different gestures may be registered depending upon the length of time that the touch remains stationary prior to movement.

A drag 176 involves a touch (represented by circle 190) with movement 194 in a direction. The drag 176 may involve an initiating touch that remains stationary on the touch sensitive device for a certain amount of time represented by the border 192. In contrast, a flick 178 may involve a touch with a shorter dwell time prior to movement than the drag as indicated by the thinner border 192" of the flick 178. Thus, again different gestures may be produced by differing dwell times of a touch prior to movement. The flick 178 may also include movement 194. The direction of movement 194 of the drag and flick 178 may be referred to as the direction of the drag or direction of the flick. Thus, a drag to the right may describe a drag 176 with movement 194 to the right.

In an embodiment, a gesture having movement (e.g., a flick or drag gesture as described above) may be limited to movement in a single direction along a first axis. Thus, while movement in a direction different than along the first axis may be disregarded so long as contact with the touch sensitive device is unbroken. In this regard, once a gesture is initiated, movement in a direction not along an axis along which initial movement is registered may be disregarded or only the vector component of movement along the axis may be registered.

In FIGS. 5A-B, a device is shown in an open position such that a first display 102 and a second display 104 are generally positioned adjacent and parallel to one another. In FIG. 5A, a single screen application 148 may be displayed on the first display 102 and a second desktop screen 138b may be displayed on a second display 104. In FIG. 5A, a drag gesture 176 may be received at a touch sensitive portion of the device. Note that the touch sensitive portion may be provided apart from the first display 102 and the second display 104. As such, the drag gesture 176 may be received such that the means of imparting the gesture do not cover the displays 102, 104. The drag 176 may be to the right. Accordingly, in response to the drag 176, the device may be changed to a state shown in FIG. 5B wherein the single screen application 148 that was displayed in the first display 102 is moved to the second display 104. Of note, the single screen application 148 is moved in the same direction as the direction of the drag 176. Also, a first desktop screen 138a that was previously obscured by the single screen application 148 in the first display 102 is exposed and the second desktop screen 138b that was previously exposed in the second display 104 is hidden. In this regard, the relative positions of the desktop screens 138a, 138b may not change between the states shown in FIGS. 5A and 5B. Rather, the single screen application 148 may simply moved from the first display 102 to the second display 104.

As shown in 5B, a drag 176 may be received while the single screen application 148 is displayed in the second display 104. The drag 176 may be a drag to the left. As a result, the displays 102, 104 may be changed to the relation as shown in FIG. 5C wherein the single screen application 148 is moved from right to left such that the single screen application 148 is displayed in first display 102 and the second desktop screen 138b of the second display 104 is again displayed. The receipt of another drag 176 to the left when the device is in a state as shown in FIG. 5C may not result in any movement of the application between displays as the first display 102 is the leftmost display and the drag command 176 was from right to left. Thus, no further movement of the application from right to left is available. Thus, the first and second display may remain unchanged as shown in FIG. 5D.

Figure 10A:
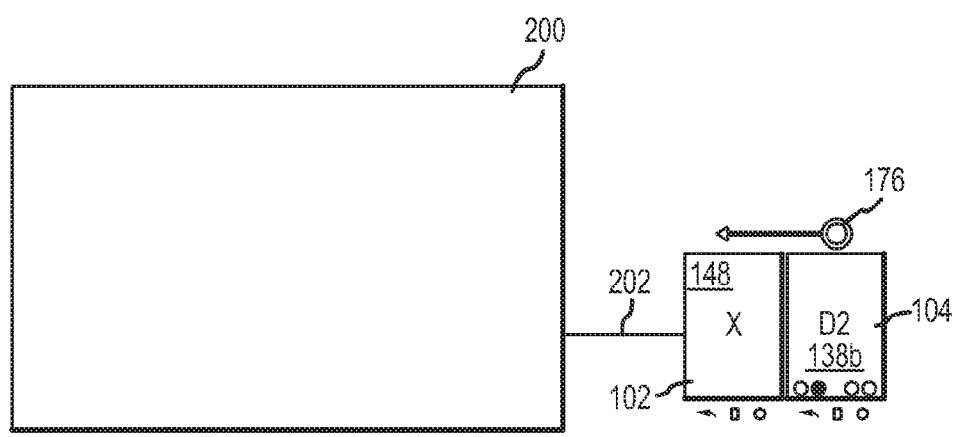
FIGS. 10A-B are graphical representations of the interaction between an embodiment of a handheld computing device and an external display in response to a gesture input.
Figure 10B:
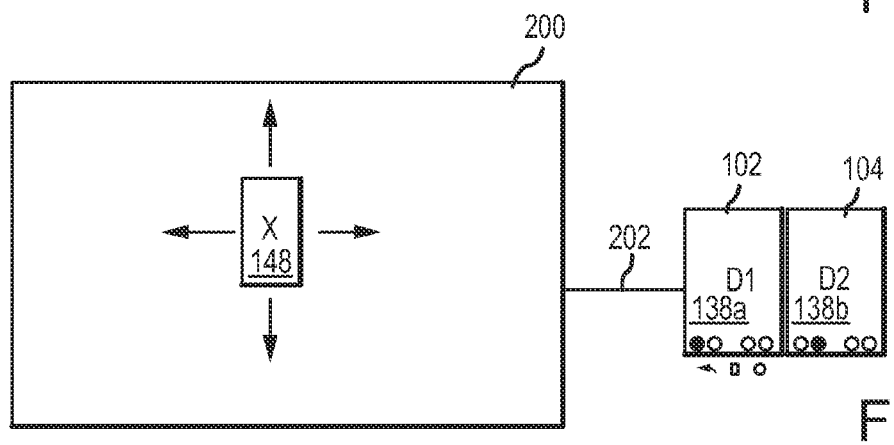

An alternative embodiment is depicted in FIGS. 10A-B. FIG. 10 depicts a device having a first display 102 and a second display 104. The device may be connected to an external display 200 by way of a display connection 202. For instance, the display connection 202 may be by way of an I/O module 130 as shown and described with reference to FIG. 1. In this regard, a drag gesture 176 may be received by the device as shown in FIG. 10A. The drag gesture 176 may result in the single screen application 148 displayed in the first display 102 being moved to the external display 200. While FIG. 10 depicts the single screen application 148 being moved to the external display by dragging to the left of the leftmost display, a similar action may also occur if a screen is dragged to the right of the rightmost display. Additionally, while the single screen application 148 may be constrained to movement along a single axis when moved between the first display 102 and the second display 104, in FIG. 10B, once the single screen application 148 has been moved to the external display 200, the single screen application 148 may be movable in any direction and not be limited or constrained to a single axis. Additionally, while not depicted, the single screen application 148 may be moved from the external display 200 to the first display 102 or the second display 104 in response to a gesture received at a touch sensitive device. Further still, while the foregoing has been described as a single screen application 148 being moved between a device and an external display, it will also be understood that the screen moved from the device to the external display 200 may correspond to a multi screen application, or some other screen displayed on a display. A screen that is moved to the external display 200 may be expanded as was described above once moved to the external display 200.

In this regard, the progression shown in FIGS. 5A-5D allows for gestures to be used to move a screen between displays. Of note, the screen is moved in the direction of the drag gesture such that a left to right drag gesture results in left to right movement of the screen from the first display to the second display. An opposite movement of a right to left gesture produces movement of the screen from the right screen to the left screen, however, when the screen is in the left screen, a subsequent right to left movement will not further move the application between displays as it is in the leftmost position, unless an alternate display (e.g., external monitor 200) is provided. When movement between screens is unavailable as discussed above, the screen may undergo some amount of movement prior to snapping back to the original position of the screen. This may alert the user that the requested move is unavailable.

While the drag gestures 176 shown in FIGS. 5A-D include only horizontal motion after the initial touch, this may not be actual movement of the touch during the gesture. For instance, once the drag is initiated in the horizontal direction, movement in a direction other than in the horizontal direction may not result in movement of the screen to be moved in the direction different and the horizontal direction. For instance, with further reference to FIG. 11, the drag 176 from left to right may be initiated with initial movement 204 from left to right along an initiated direction 210. Subsequently, while maintaining contact with the touch sensitive device, the user may input an off direction movement 206 in a direction different than the initiated direction 210. In this regard, the off direction movement 206 may not result in any movement of a screen between two displays. Furthermore, the user may input partially off direction movement 208, where only a vector portion of the movement is in the direction of the initiated direction 210. In this regard, only the portion of the partially off direction movement 208 may result in movement of a screen between displays. In short, the movement of application screens between the first display 102 and the second display 104 may be constrained along a single axis along which the displays are arranged.

Figures 6A, 6B, 6C:
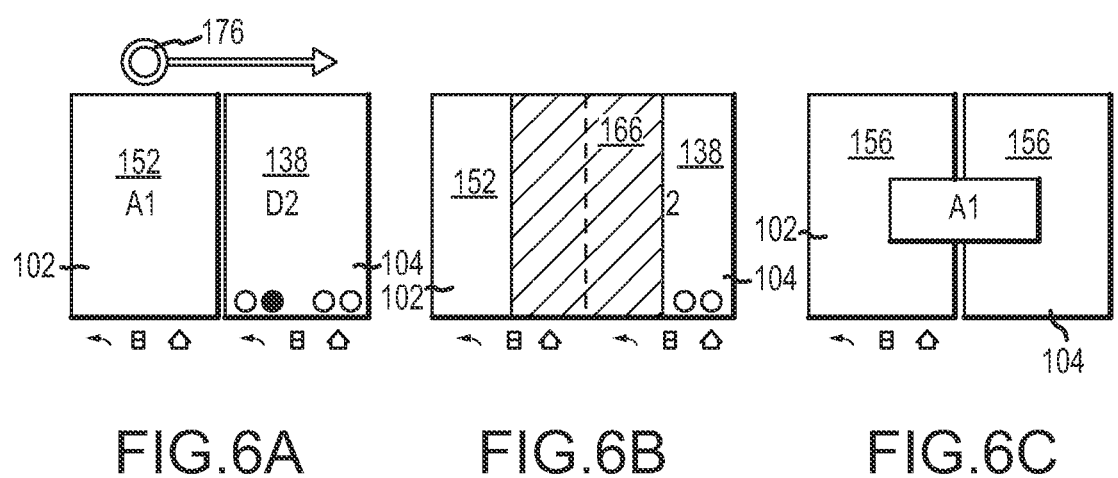
FIGS. 6A-C are graphical representations of another embodiment of a handheld computing device functioning in response to a gesture input.

FIGS. 6A-6C show an alternative use of a drag gesture with a device. In FIG. 6A, a multi screen application 152 is shown in single screen mode such that the multi screen application occupies only a first display 102. A drag gesture 176 from left to right is received by the device. Subsequently, the displays 102 may be modified to an arrangement as shown in FIG. 6B such that an intermediate phase of the display is shown wherein empty views 166 are displayed on the first display 102 and second display 104. It is not necessary that the empty views 166 shown in FIG. 6B be interpretable by the user as an effective input or output display, but rather merely the empty views 166 may effectively communicate to the user that the action of the expansion of the application across an additional screen is occurring. The application may not be able to rest, wait, process or interpret input while displaying the empty view 166. Accordingly, the empty views 166 may reflect the status of the multi screen application 152 with regard to the received gesture 176. That is, the empty views 166 may show the multi screen application 152 being move from the first display 102 to the second display 104 corresponding to the movement of the drag 176.

A snap feature may be provided for movement of a screen from the first display 102 to the second display 104. In this regard, if the gesture input is released prior to the screen being displayed completely in the second display 104, the screen may not remain as displayed straddling the first split 102 and second display 104. Rather, the screen may snap to a display position such that the screen entirely occupies the first display 102, the second display 104, or both the first display 102 and the second display 104.

As shown in FIG. 6C, the multi screen application 152 may be maximized over both screens such that the multi screen application 152 occupies both the first display 102 and the second display 104. As stated above, the maximization of the multi screen application 152 across the first display 102 and the second display 104 may result in a node application screen being displayed, the single screen of the multi screen application being scaled to occupy both screens, or the addition of viewing area without additional scaling.

FIGS. 7A-7E depict the receipt of a flick command for a multi screen application 152 executing in single screen mode. As shown in FIG. 7A, a multi screen application 152 is shown in a single screen mode such that it occupies the first display 102. Upon receipt of flick 178, the device may transition to the intermediate stage shown in FIG. 7B. In FIG. 7B, the first display 102 and the second display 104 may show empty views 166 that may illustrate movement of the application into the second display 104. The sequence may progress to another intermediate phase shown FIG. 7C, wherein the multi screen application 152 occupies both the first display 102 and second display 104. The sequence continues such that, shown in FIG. 7D, the first display 102 in second display 104 again both display empty views 166 that may indicate the application is moving from the first display 102. Finally, the device may come to a state shown in FIG. 7E, wherein the multi screen application 152 resides in the second display 104 in single screen mode and a first desktop screen 138a that was obscured in FIG. 7A is fully viewable as shown in FIG. 7E. In this regard, a flick 178 may result in a multi screen application 152 being moved completely from the first display 102 to the second display 104.

In this regard, the same gesture (e.g., a drag gesture described above) received by the device when displaying different types of applications may result in different functionality. For instance, a drag gesture 176 received by the device when displaying a single screen application 148 may result in the single screen application 148 being moved from the first display 102 to the second display 104 (e.g., shown in FIG. 5). In contrast, the drag gesture 176 received by a device when displaying a multi screen application 152 may result in the multi-screen application 152 being maximized across multiple displays (e.g., as shown in FIG. 6). In this regard, the functionality associated with a gesture input may be contextually dependent upon the nature or type of application displayed when the gesture is received.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method for controlling a plurality of displays of a handheld computing device, comprising:
    providing a hand held device having two displays, wherein the displays are physically attached but movable with respect to each other, wherein when the hand held device is folded, the two displays face in substantially opposite directions and, when the hand held device is open, the displays face in a substantially same direction, wherein the first display includes a first gesture sensor and a first touch sensitive display within a boundary of a first bezel, and wherein the second display includes a second gesture sensor and a second touch sensitive display within a boundary of a second bezel, wherein the first and second gesture sensors accept touch input but do not display information on the first or second displays;
    executing an application on said handheld computing device such that a screen of said application is displayed in the first touch sensitive display;
    receiving a first gesture input at the first or second gesture sensor of said handheld computing device, wherein the first and second gesture sensors are physically separate from the first and second touch sensitive displays;
    modifying the first and second touch sensitive displays in response to the first gesture input such that the screen is displayed in at least a second touch sensitive display of the plurality of touch sensitive displays, wherein if the first gesture input were received in the first or second touch sensitive display, a different response would occur, and wherein at least one of the following is true:
    (a) the first gesture input is directional, the second touch sensitive display is located in a direction with respect to the first touch sensitive display corresponding to the direction of the first gesture, the screen occupies a single touch sensitive display and said modifying includes moving the screen from the first touch sensitive display to the second touch sensitive display, and the modifying includes revealing an underlying screen in the first touch sensitive display and obscuring another screen in the second touch sensitive display,
    (b) the first gesture input is directional, the second touch sensitive display is located in a direction with respect to the first touch sensitive display corresponding to the direction of the first gesture, the application is expandable to occupy the first and second touch sensitive displays and the modifying includes expanding the application such that one or more screens corresponding to the application occupy both the first touch sensitive display and the second touch sensitive display, and the expanding includes scaling the application to occupy the first and second touch sensitive display, or
    (c) the modifying includes constrained movement of the screen linearly between the first touch sensitive display and the second touch sensitive display.

2. The method according to claim 1, wherein (a) is true.

3. The method according to claim 1, wherein (b) is true.

4. The method according to claim 1, wherein (c) is true.

5. The method according to claim 4, wherein the handheld computing device is in operative communication with an external display, and the method further comprises relocating the screen from the first touch sensitive display to the external display.

6. The method according to claim 4, wherein once the screen has been relocated to the external display, the screen is unconstrainably moveable about the external display.

7. A method for controlling a plurality of displays of a handheld computing device, comprising:
 executing an application on a handheld computing device such that one or more displays of said application is displayed in a first touch sensitive display and a second touch sensitive display of said handheld computing device, wherein the hand held computing device has two touch sensitive displays including the first and second touch sensitive displays, wherein the touch sensitive displays are physically attached but movable with respect to each other, wherein when the hand held device is folded, the two touch sensitive displays face in substantially opposite directions and, when the hand held device is open, the touch sensitive displays face in a substantially same direction, wherein the first touch sensitive display includes a first gesture sensor and a touch sensitive display, within a boundary of a first bezel, and wherein the second touch sensitive display includes a second gesture sensor and a touch sensitive display, within a boundary of a second bezel, wherein the first and second gesture sensors accept touch input but do not display information on the first or second touch sensitive displays;
 receiving a gesture input at the first or second gesture sensor of said handheld computing device, wherein the first and second gesture sensors are physically separate from the first and second touch sensitive displays; and
 modifying the first and second touch sensitive displays in response to the gesture input such that the application is displayed in the first touch sensitive display of the handheld computing device and not in the second touch sensitive display, wherein if the first gesture input were received in the first or second touch sensitive display, a different response would occur, wherein the gesture display is directional and the first touch sensitive display corresponds to the direction of the gesture, and wherein at least one of the following is true:
 (a) said modifying includes hiding a node screen displayed in the second touch sensitive display prior to the modifying, or
 (b) said modifying includes reducing the visible area of the application.

8. The method according to claim 7, wherein (a) is true.

9. The method according to claim 7, wherein (b) is true.

10. A non-transitory computer readable medium that causes a processor to execute a method for controlling a plurality of displays of a handheld computing device, comprising:
 providing a hand held computing device with a unitary display having two portions, wherein the two portions are logically separate, wherein a first portion is a first touch sensitive display and is associated with a first gesture sensor, and wherein a second portion is a second touch sensitive display and is associated with a second gesture sensor;
 executing an application on said handheld computing device such that a screen of said application is displayed in the first touch sensitive display;
 receiving a first gesture input at the first gesture sensor or the second gesture sensor of said handheld computing device, wherein the first and second gesture sensors are physically separate from the first and second touch sensitive displays but located on the display within a boundary of a bezel defining the unitary display, and wherein the first and second gesture sensors accept touch input but do not display information on the first or second touch sensitive displays;
 in response to the first gesture input, modifying the first and second touch sensitive displays such that the screen is displayed in at least the second touch sensitive display, wherein if the first gesture input were received in the first touch sensitive display, a different response would occur.

11. The non-transitory computer readable medium according to claim 10, wherein the first gesture input is directional, the second touch sensitive display is located in the direction of the first gesture, wherein the screen occupies a single display, wherein the modifying includes moving the screen from the first touch sensitive display to the second touch sensitive display, and wherein the modifying includes revealing a second screen in the first touch sensitive display and obscuring a third screen in the second touch sensitive display.

12. The non-transitory computer readable medium according to claim 10, wherein the first gesture input is directional, wherein the second touch sensitive display is located in a direction of the first gesture, wherein the application is expandable to occupy multiple displays, wherein the modifying includes expanding the application such that the screen occupies both the first touch sensitive display and the second touch sensitive display, wherein the expanding includes scaling the screen to occupy the first and second touch sensitive displays, and wherein the modifying includes obscuring a second screen in the second touch sensitive display.

13. The non-transitory computer readable medium according to claim 10, wherein the modifying includes constrained movement of the screen linearly between the first touch sensitive display and the second touch sensitive display.

* * * * *